(12) United States Patent
Kludt et al.

(10) Patent No.: US 8,649,458 B2
(45) Date of Patent: Feb. 11, 2014

(54) USING ANTENNA POOLING TO ENHANCE A MIMO RECEIVER AUGMENTED BY RF BEAMFORMING

(71) Applicant: Magnolia Broadband Inc., Warren, NJ (US)

(72) Inventors: Kenneth Kludt, San Jose, CA (US); Eduardo Abreu, Allentown, PA (US); Haim Harel, New York, NY (US)

(73) Assignee: Magnolia Broadband Inc., Englewood, NJ (US)

( * ) Notice: Subject to any disclaimer, the term of this patent is extended or adjusted under 35 U.S.C. 154(b) by 97 days.

(21) Appl. No.: 13/762,159

(22) Filed: Feb. 7, 2013

(65) Prior Publication Data

US 2013/0322573 A1 Dec. 5, 2013

Related U.S. Application Data

(63) Continuation-in-part of application No. 13/630,146, filed on Sep. 28, 2012.

(60) Provisional application No. 61/652,743, filed on May 29, 2012, provisional application No. 61/657,999, filed on Jun. 11, 2012, provisional application No. 61/665,592, filed on Jun. 28, 2012, provisional application No. 61/658,015, filed on Jun. 11, 2012, provisional application No. 61/665,600, filed on Jun. 28, 2012, provisional application No. 61/671,417, filed on Jul. 13, 2012.

(51) Int. Cl.
*H04B 7/02* (2006.01)

(52) U.S. Cl.
USPC ............................ 375/267; 375/260; 375/259

(58) Field of Classification Search
USPC ......................................... 375/267, 260, 259
See application file for complete search history.

(56) References Cited

U.S. PATENT DOCUMENTS 6,226,507 B1 5/2001 Ramesh et al.
6,321,077 B1 11/2001 Saitoh et al.
(Continued)

FOREIGN PATENT DOCUMENTS

EP 1 867 177 5/2010
EP 2 234 355 9/2010
(Continued)

OTHER PUBLICATIONS

Office Action issued by the United States Patent and Trademark Office for U.S. Appl. No. 13/630,146 dated Jan. 22, 2013.

(Continued)

*Primary Examiner* — Michael Neff
(74) *Attorney, Agent, or Firm* — Pearl Cohen Zedek Latzer, LLP

(57) ABSTRACT

A system having a multi-layer (multi-stream) multiple-input-multiple-output (MIMO) receiving system, having a MIMO baseband module and a radio distribution network (RDN) connected to the MIMO receiving system. The RDN has two or more beamformers that are fed by two or more antennas, so that a total number of antennas in the system are greater than the number of branches of the MIMO baseband module. Each of the beamformers combines RF signals coming from the antennas. The system further implements an antenna routing module that swaps antennas between different beamformers according to one or more qualitative indicators derived from the baseband module, thus increasing the probability of grouping antennas that have lower conflicts between best phases of different layers' transmitted signals. The system increases the range of antenna selection beyond the set of antennas available for each beamformer.

10 Claims, 7 Drawing Sheets

(56) References Cited

U.S. PATENT DOCUMENTS

| | | |
|---|---|---|
| 6,377,783 B1 | 4/2002 | Lo et al. |
| 6,927,646 B2 | 8/2005 | Niemi |
| 6,987,958 B1 | 1/2006 | Lo et al. |
| 7,257,425 B2 | 8/2007 | Wang et al. |
| 7,499,109 B2 | 3/2009 | Kim et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 8,155,613 B2 | 4/2012 | Kent et al. |
| 8,294,625 B2 | 10/2012 | Kittinger et al. |
| 8,369,436 B2 | 2/2013 | Stirling-Gallacher |
| 2005/0129155 A1 | 6/2005 | Hoshino |
| 2005/0245224 A1 | 11/2005 | Kurioka |
| 2006/0135097 A1 | 6/2006 | Wang et al. |
| 2006/0270343 A1 | 11/2006 | Cha et al. |
| 2008/0238808 A1 | 10/2008 | Arita et al. |
| 2009/0028225 A1 | 1/2009 | Runyon et al. |
| 2009/0121935 A1 | 5/2009 | Xia et al. |
| 2010/0172429 A1 | 7/2010 | Nagahama et al. |
| 2010/0285752 A1 | 11/2010 | Lakshmanan et al. |
| 2011/0032972 A1 | 2/2011 | Wang et al. |
| 2011/0150050 A1 | 6/2011 | Trigui et al. |
| 2011/0249576 A1 * | 10/2011 | Chrisikos et al. ............. 370/252 |
| 2011/0281541 A1 | 11/2011 | Borremans |
| 2012/0230380 A1 * | 9/2012 | Keusgen et al. ............. 375/227 |

FOREIGN PATENT DOCUMENTS

| | | |
|---|---|---|
| WO | WO 03/047033 | 6/2003 |
| WO | WO 03/073645 | 9/2003 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.

Office Action issued by the United States Patent and Trademark Office for U.S. Appl. No. 13/762,191 dated May 2, 2013.

Office Action issued by the United States Patent and Trademark Office for U.S. Appl. No. 13/762,188 dated May 15, 2013.

* cited by examiner

USING ANTENNA POOLING TO ENHANCE A MIMO RECEIVER AUGMENTED BY RF BEAMFORMING

CROSS-REFERENCE TO RELATED APPLICATIONS

This application is a non-provisional patent application claiming benefit of US provisional patent applications: 61/658,015 filed on Jun. 11, 2012; 61/665,600 filed on Jun. 28, 2012; and 61/671,417 filed on Jul. 13, 2012; this application is also a continuation-in-part application of U.S. patent application Ser. No. 13/630,146 filed on Sep. 28, 2012, which claims benefit from US provisional patent applications: 61/652,743 filed on May 29, 2012; 61/657,999 filed on Jun. 11, 2012; and 61/665,592 filed on Jun. 28, 2012, all of which are incorporated herein by reference in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and M is the total number of antennas and M>N). This architecture employs a beamformer for each channel so that two or more antennas are combined for each radio circuit that is connected to each of the channels.

In hybrid MIMO RDN receiving systems, when the phases of the received signals from each antenna are properly adjusted or tuned with respect to one another, the individual signals may be combined and result in an improved SNR for the receiving system.

BRIEF SUMMARY OF EMBODIMENTS OF THE INVENTION

While standard MIMO receivers are capable of accumulating energy from all available antennas for each layer, without interdependency, additional antennas that are RF combined may need to rely on one weights setting that fits all layers, which may adversely affect performance; the source of the issue comes from the random or loosely correlated nature of the various layers' signals, as viewed by the various participant antennas in the RF beamforming; specifically, phases setting that optimizes a group of RF combined antennas' output for a given layer, may be suboptimal or even detrimental to others; it is therefore imperative to set a weight in such a way that will consider all layers.

Embodiments of the present invention provides a method that increases the set of antennas to be chosen, beyond the number of available inputs in the given RF combiners; it thus takes advantage of the very same randomness that characterizes the various layers' signals seen by each receiving antenna, picking best combinations and providing reduction of the performance loss; to achieve that, the invention offers a categorization where each candidate antenna to be combined with others is declared "good" if it can see all layers in non-conflicting phases, and "bad" if it cannot.

Finally, embodiments of the invention take advantage of possible existence of several RF beamformers in the MIMO receiving system, each required to solve the same issue, by swapping antennas amongst the various beamformers, and thus using all or most available antenna resources.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
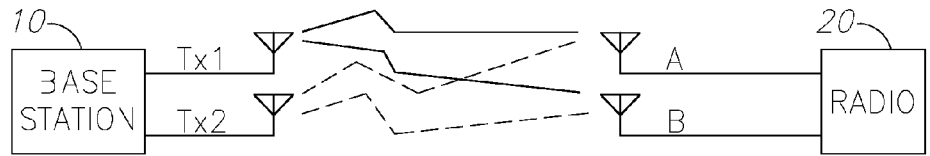
FIG. 1 is an example of a legacy 2×2 MIMO system according to the prior art.

The drawings together with the following detailed description make the embodiments of the invention apparent to those skilled in the art.

DETAILED DESCRIPTION OF EMBODIMENTS OF THE INVENTION

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 shows an example of a standard 2×2 MIMO receiver with two antennas communicating with a base station. While each antenna receives both transmitted layers, the baseband separates them in the decoding process, while combining the energy received by each antenna.

Figure 2:
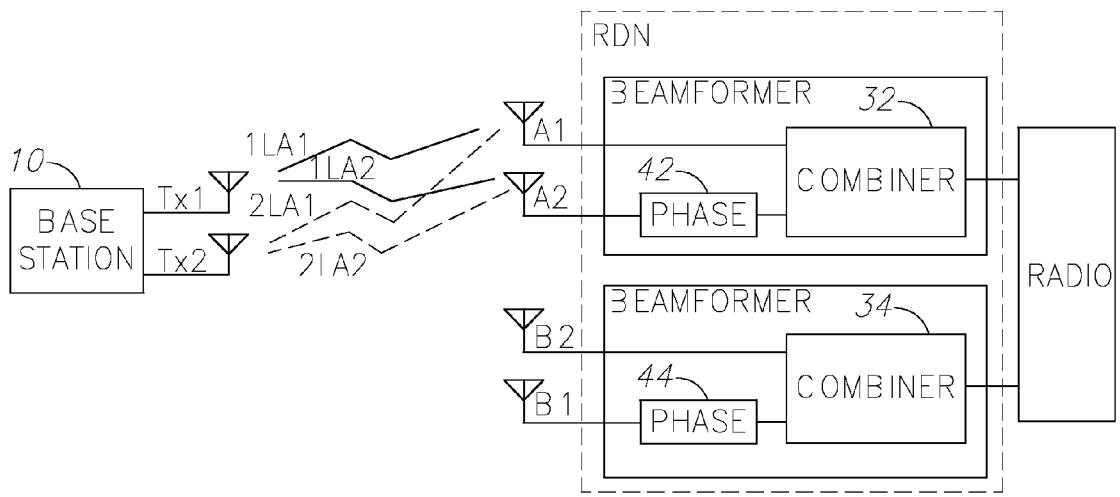
FIG. 2 is an example of the 2×2 MIMO system augmented by a Radio Distribution Network (RDN) according to the present invention.

FIG. 2 shows an example of the MIMO receiver augmented by two additional antennas: if the phase shift introduced between the two antennas by phase shifters 42 and 44 optimizes the 1st layer, that phase shifter setting will only be correct for the $2^{nd}$ layer if multipath experienced by the two layers are similar That is unlikely as multi-layer MIMO design is based on low correlation of the various streams; consequently, the relations between those phases that optimize both layers tend to be random.

Consider a simplified example case, where the said two layers are each transmitted from one Tx antenna (so that Tx1 radiates one stream and Tx2 the other): If we compare the case using four 90 degree phase shifts to align the signals from Tx1, we see there are three possible outcomes for the Tx2 signal:

1. The signals arrive at the antennas A1 and A2 with a similar phase differences as for the Tx1 transmission so the same phase setting used to enhance the reception of Tx1 will also enhance Tx2. (25%)
2. The resulting Tx2 signals to A1 and A2 are +/−90 degrees from each other and will produce zero diversity gain for this process. (50%)
3. The resulting Tx2 signals are 180 degrees from each other and can cancel each other and produce a negative diversity gain depending on their relative amplitudes. (25%)

When the result is the outcome 3, the system could choose to sacrifice diversity gain for Tx1 in order to avoid the total loss of the Tx2 signal. This may result in low diversity gain (~0 dB) for both Tx1 and Tx2.

The issue at hand is the need to use a single degree of freedom i.e. the need to choose one phase in aligning a beamformer that serves 2, 4, or more different phase setting, stemming from the fact that multiple incoming signals have each a specific possible phase alignment for the beamformer. This invention presents an alternate approach to sacrificing gain as described above. The need to sacrifice diversity gain may be averted by providing a choice of additional antenna combinations.

The present invention, in embodiments thereof, discloses a system comprising: (i) a multiple-input-multiple-output (MIMO) receiving system comprising a MIMO baseband module having N branches; (ii) a radio distribution network (RDN) connected to the MIMO receiving system, the RDN comprising at least two beamformers, wherein each of the beamformers is fed by two or more antennas, so that a total number of antennas in the system is M, wherein M is greater than N, wherein each of the beamformers includes at least one combiner configured to combine signals coming from the antennas feeding the respective beamformer into a combined signal; and (iii) an antenna routing module configured to swap at least one pair of antennas, each of the antennas in the at least one pair being associated with a different beamformer, wherein the antenna routing module is configured to swap said at least one pair of antennas.

These additional, and/or other aspects and/or advantages of the present invention are set forth in the detailed description which follows.

When using a phase optimization process like the antennas selection application, the enhancement achieved, is based on suboptimal setting for TX1 in order to eliminate destructive combining in other Tx signals.

This invention is yet another enhancement which increases the range of antenna selection beyond the set of antennas available for each beamformer, thus increasing the probability of grouping antennas that have lower conflicts between best phases of different Tx signals. The present invention can be used with or without phase selection process.

The system, as illustrated in FIGS. 3, 5 and 8-11 that are explained in detail below, comprises a multiple-input-multiple-output (MIMO) receiving system comprising a MIMO baseband module having N branches and a radio distribution network (RDN) connected to the MIMO receiving system.

The RDN comprising at least two beamformers, each fed by two or more antennas, so that a total number of antennas in the system is M, wherein M is greater than N.

Each beamformer includes at least one combiner configured to combine signals coming from the antennas feeding the respective beamformer into a combined signal.

The system further comprises an antenna routing module configured to swap at least one pair of antennas, each of the antennas in the at least one pair being associated with a different beamformer. The antenna routing module is configured to swap said at least one pair of antennas In some embodiments, the antenna routing module may be configured to route a subset of the antennas with respect to corresponding beamformers according to a switching matrix that is dynamically adjusted according to the qualitative indicators. Examples for matrices are presented in FIGS. 3 (matrix 70), FIG. 8 (matrix 832) and FIG. 11 (matrix 1132 & 1134), as well as in FIGS. 5, 9 and 10, as implemented the switches (see below).

The swapped pair of antennas may be selected to increase a diversity gain of the MIMO receiving system.

The swapped pair of antennas may be selected with respect to at least one of signal phases and signal amplitudes.

The swapped pair of antennas may be selected according to a specified antenna signal weighting.

The qualitative indicators comprise a combined power of all beamformers, $PWR_{TOTAL}$, defined as (see explanation below):

$$PWR_{TOTAL} = \sum_{r=1}^{NBF} BF_{PWR_r},$$

where NBF is the total number of beamformers in RDN and $BF_{PWR_r}$ is output power of the beamformer "r".

and at least one swapped pair of antennas may be selected to maximize $PWR_{TOTAL}$.

The present invention further comprises a method of improving reception by a multiple-input-multiple-output (MIMO) receiving system comprising a MIMO baseband module having N branches and a radio distribution network (RDN) connected to the MIMO receiving system.

The method comprises associating at least two beamformers with the RDN, each of the beamformers including at least one corresponding combiner; feeding each of the beamformers by two or more antennas, so that a total number of antennas in the system is M, wherein M is greater than N; configuring each combiner to combine signals coming from the antennas feeding the corresponding beamformer into a combined signal; and swapping at least one pair of antennas, each of the antennas in the at least one pair being associated with a different beamformer, based on qualitative indicators derived from the baseband module.

In embodiments, the method further comprises routing a subset of the antennas with respect to corresponding beamformers by a switching matrix that is dynamically adjusted according to the qualitative indicators. In embodiments, the method further comprises selecting the at least one swapped pair of antennas according to the above specified criteria.

Figure 3:
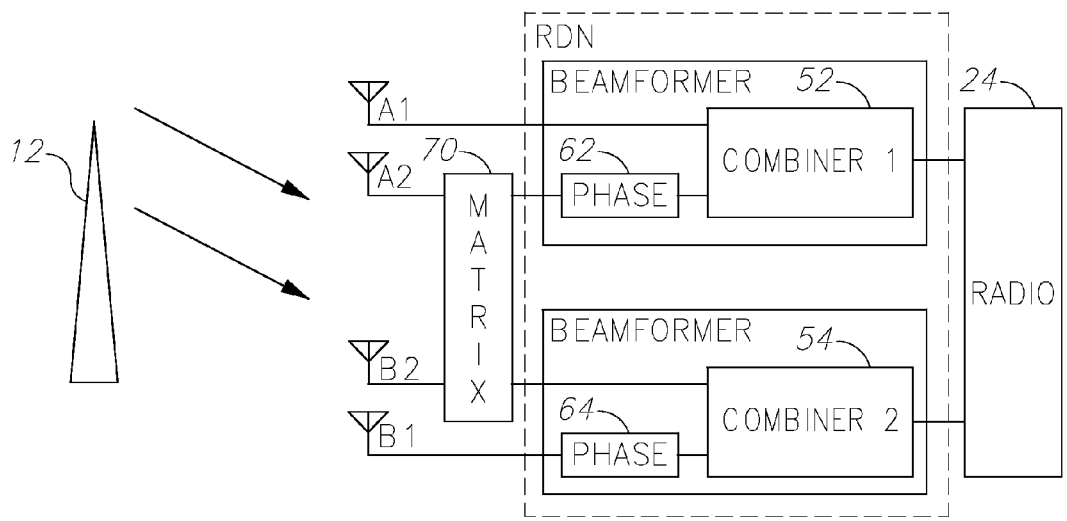
FIG. 3 is a schematic high level illustration of a simple MIMO receiving system with the RDN and antenna routing module, according to some embodiments of the invention.

FIG. 3 is a schematic high level illustration of a simple MIMO receiving system with the RDN and antenna routing module, according to some embodiments of the invention. One beamformer in the RDN comprises phase modulator 62 and combiner 52, another beamformer comprises phase modulator 64 and combiner 54. Antenna routing module comprises switching according to matrix 70, as explained below. It shows that the antennas A2, B2 are placed in an "Antenna Pool" and selected under processor control through a matrix switch 70 to be combined. In this example, antenna A1 may be paired with either A2 or B2 to improve chances of non-conflicting phase setting for both layers.

Figure 4:
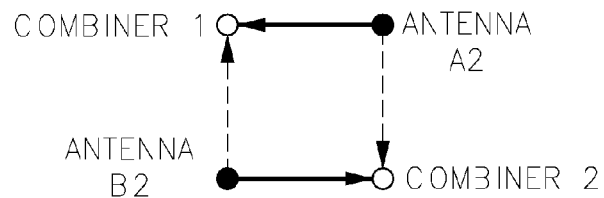
FIG. 4 is an implementation for antenna routing module using switch matrix for the case illustrated in FIG. 3, according to some embodiments of the invention.

FIG. 4 is an implementation for switch matrix 70 for the case illustrated in FIG. 3, according to some embodiments of the invention. In this simple case switch matrix 70 is implemented as a transfer switch.

Figure 5:
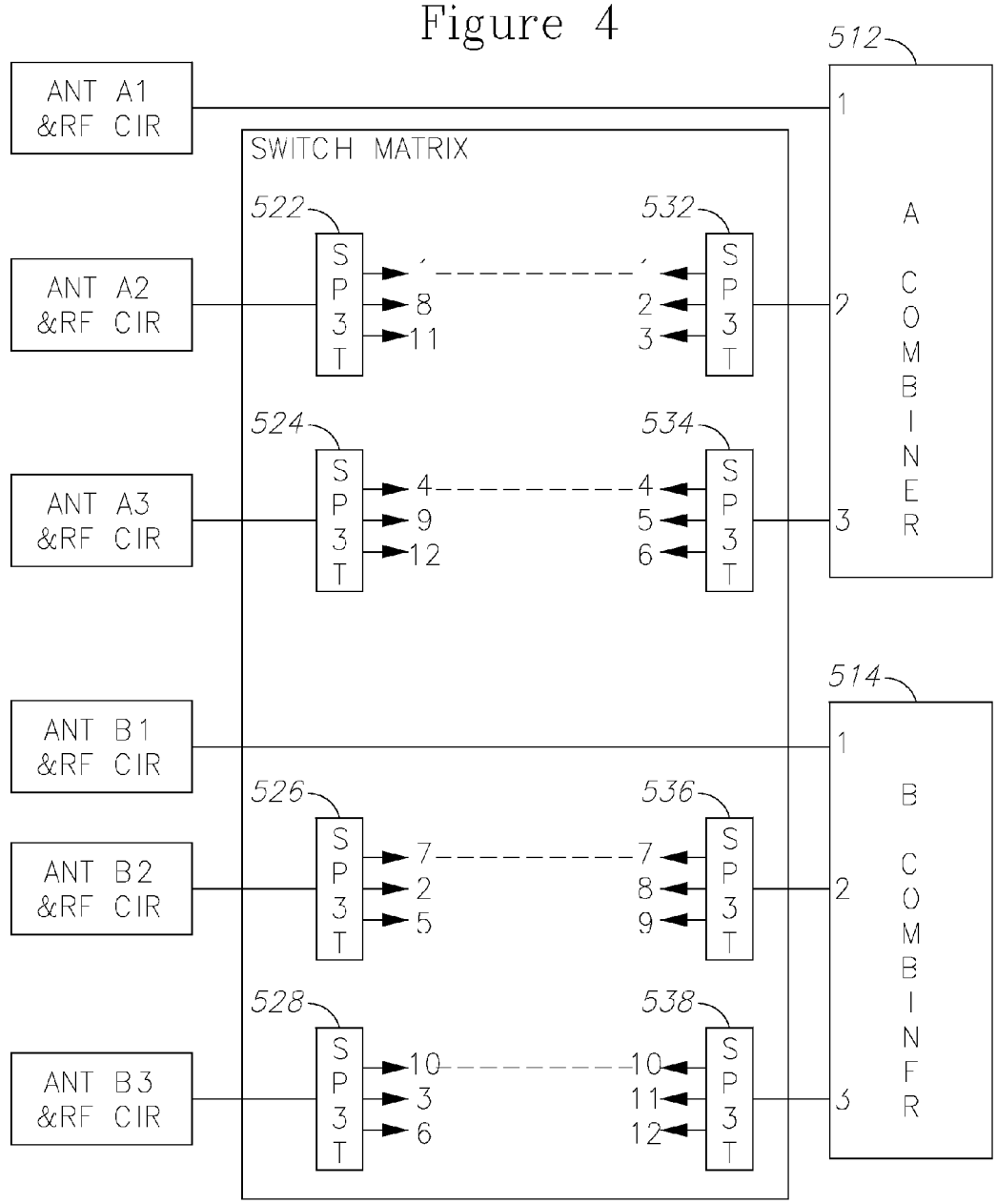
FIG. 5 is a schematic high level illustration of a more complex MIMO receiving system with the RDN and antenna routing module, according to some embodiments of the invention.

FIG. 5 is a schematic illustration of a more complex MIMO receiving system with the RDN and antenna routing module, according to some embodiments of the invention. One beamformer in the RDN is associated with antennas A1, A2 and A3 and comprises combiner 512, another beamformer is associated with antennas B1, B2 and B3 and comprises combiner 514. The antenna routing module is implemented in switches 522, 532, 524, 534 and switches 526, 536, 528, 538 corresponding to the beamformers, as explained below.

When the signals from the three antennas are perfectly aligned in phase, this configuration offers up to 4.77 dB gain over the single antenna. If the signals are aligned in phase for Tx1, there are 16 possible outcomes for receiving Tx2 when each of the two diversity antennas has four possible phases 0, 90, 180 270 degrees.

Figure 6:
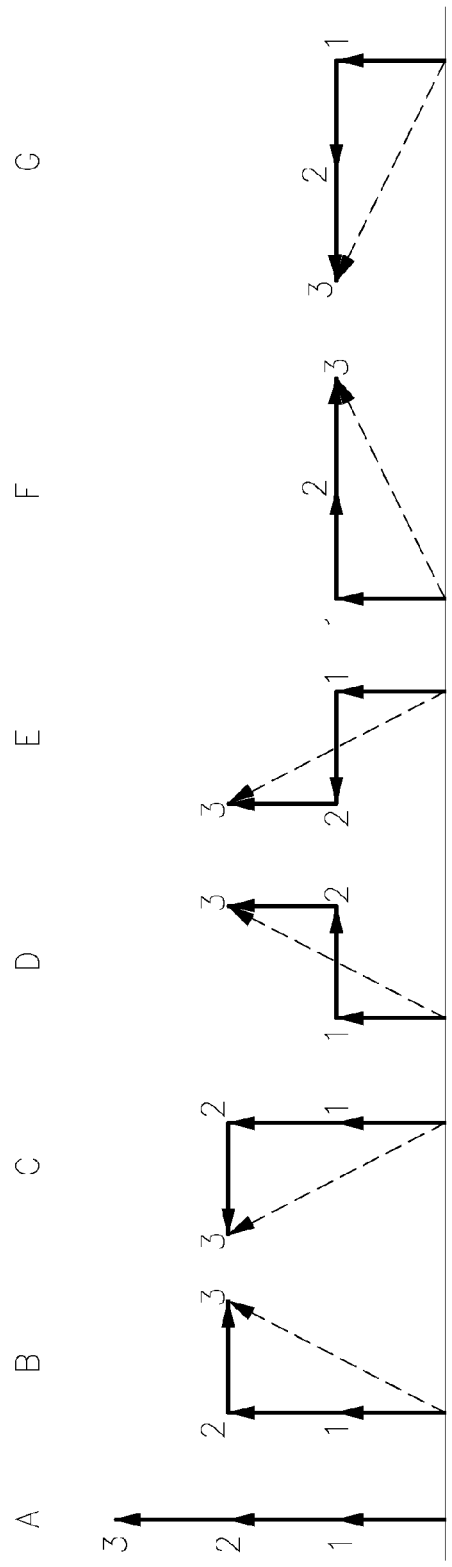
FIGS. 6 & 7 are signal phase diagrams illustrating the phase relationship of signals received by antennas according to embodiment of the present invention.
Figure 7:
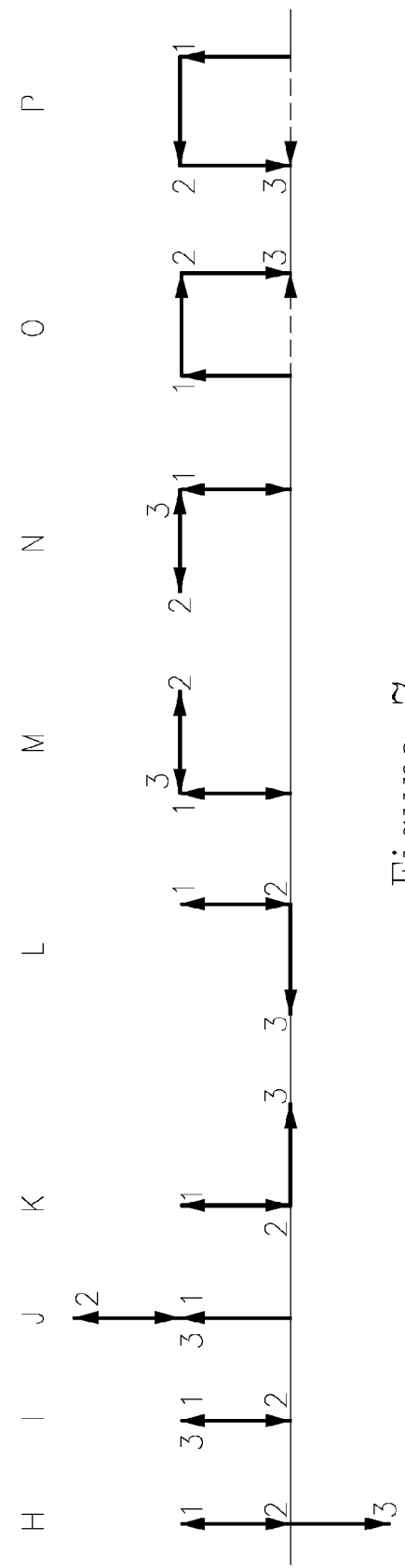

FIG. 6 and FIG. 7 are signal phase diagrams illustrating the dependency of the signals received from each antenna as they are combined in combiners 512 or 514 as described by FIG. 5. FIG. 6 shows the cases where alignment of Tx1 signals result in positive gains for Tx 2 reception, while FIG. 7 shows the cases where Tx2 signals result in negative gains. For every one of these relationships, the signal from one antenna is cancelled by one of the others, leaving a −4.77 dB result.

There are nine phase relationships designated H-P in FIG. 7 that produce negative diversity gain and seven phase relationships shown in FIG. 6 that produce positive gain. This means there is a 7/16 or 43.75% probability that the random combination of signals will produce positive diversity gain for one beamformer and about 43.75% squared (19%) chance both beamformers will produce a positive gain. 81% of the time at least one beamformer will experience negative gain. One strategy to increase the possibility to show positive gain in both beamformers is to substitute a different antenna for one of the antennas in the beamformer that produces the negative gain. If an antenna from each beamformer is swapped with the other the probability the new combination of antennas experiences negative gain is also 81%. This means for the two configurations the probability of negative gain is approximately 81% squared or 65%. This means the probability that the two beamformers both create positive gain is increased from 19% to 35% by trying a second antenna combination. Clearly, testing more antenna combinations improves the chance that we can find one combination that produces positive gain in both beamformers.

FIG. 5 illustrates a means to assign each of the four diversity antennas (A2, A3, B2 and B3) to either beamformer (A or B). We can evaluate the improvement in diversity gain for this capability by considering the pairing possibilities for antenna A1. It can be used with any two from the set of the four antennas A2, A3, B2 and B3 in combiner 512. Because the antenna pairing for Antenna B1 is determined by the antennas not used for antenna A1, the number of choices is given by the combination probability equation for "n, choose k" in formula (I) as follows $$\binom{n}{k} = \frac{n!}{k!(n-k)!} \quad (1)$$

For this case n=4 and k=2 and the equation shows there are six unique combinations for antenna selection. We can show that by choosing from the best of the six antenna combinations reduces the probability no combination produces positive gain in both beamformers from 81% to approximately 28%. This means 72% of the time we should find a combination that produces positive gain.

In the previous embodiment all of the diversity antennas were pooled to produce the maximum number of combinations to choose from. It is possible to use the circuit of FIG. 5 to allow six antenna combinations within a larger antenna array.

FIG. 7 is a schematic illustration of possible switching configurations in FIG. 5 that result in no diversity gain, according to some embodiments of the invention.

Figure 8:
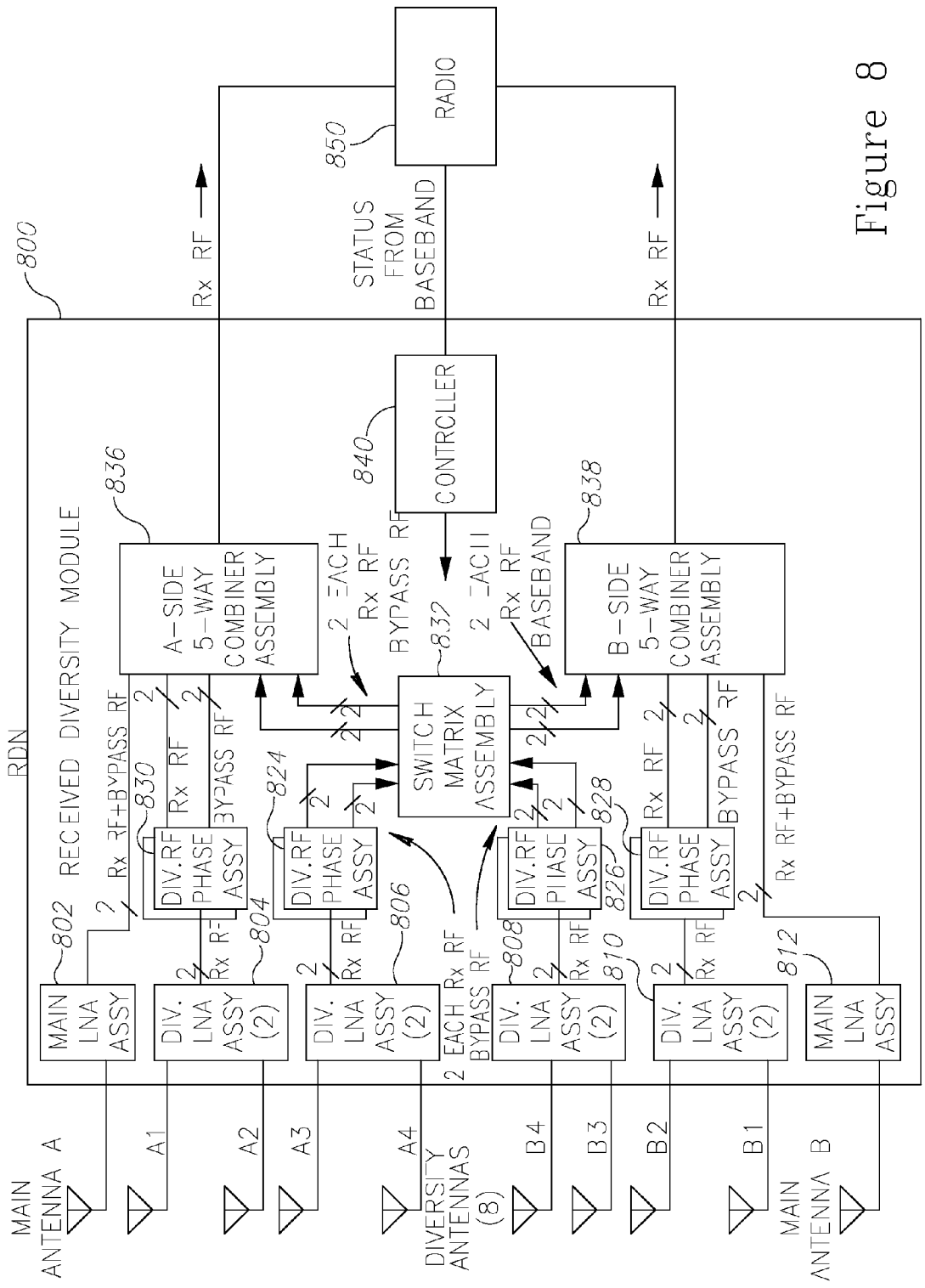
FIG. 8 is a schematic high level illustration of a MIMO receiving system having a ten antenna array with the RDN and antenna routing module pooling 4 antennas, according to some embodiments of the invention.

FIG. 8 is a schematic illustration of a MIMO receiving system having a ten antenna array with the RDN and antenna routing module embodied as device 800, according to some embodiments of the invention. One beamformer in the RDN is associated with a main antenna A and four of the diversity antennas A1 . . . A4 and comprises LNA assemblies 802, 804, 806, phase modulators 830, 824 and combiner 836, another beamformer is associated with a main antenna B and another four of the diversity antennas B1 . . . B4 and comprises LNA assemblies 808, 810, 812, phase modulators 826, 828 and combiner 838. The diversity antennas B1 . . . B4 are modulated by the corresponding LNA assemblies and phase modulators. The antenna routing module is implemented by a switch matrix assembly 832. Combiners 836 and 838 are connected to radio unit 850, which is also connected to controller 840 that controls the setting of the switch matrix 832 according to qualitative indicators that are derived from the baseband module.

Figure 9:
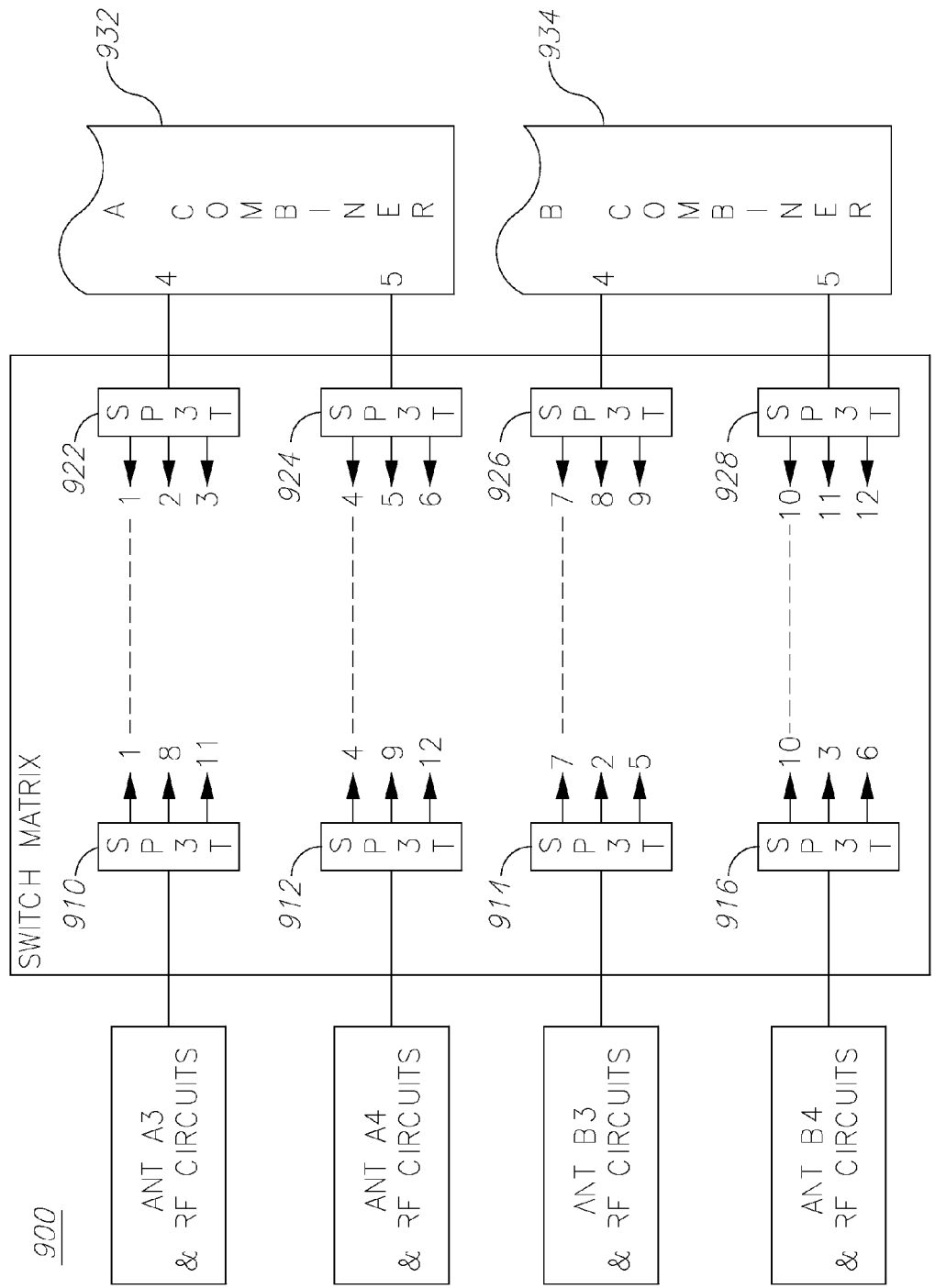
FIG. 9 is a schematic high level illustration of the switch matrix, as implemented for the system of FIG. 8, according to some embodiments of the invention.

FIG. 9 is a schematic illustration antenna routing module implementation using a switch matrix, used in the system of FIG. 8, according to some embodiments of the invention. One beamformer in the RDN is associated with antennas A, A1 . . . A4 and comprises combiner 932, another beamformer is associated with antennas B, B1 . . . B4 and comprises combiner 934. The antenna routing module implementation in the form of a switch matrix is comprised of switches 910, 922, 912, 924 and switches 914, 926, 916, 928 corresponding to the beamformers, as explained below.

For this configuration, antennas A3 and A4 are pooled with antennas B3 and B4 using the circuit of FIG. 9 to provide for the six possible configurations as in the previous discussion.

Figure 10:
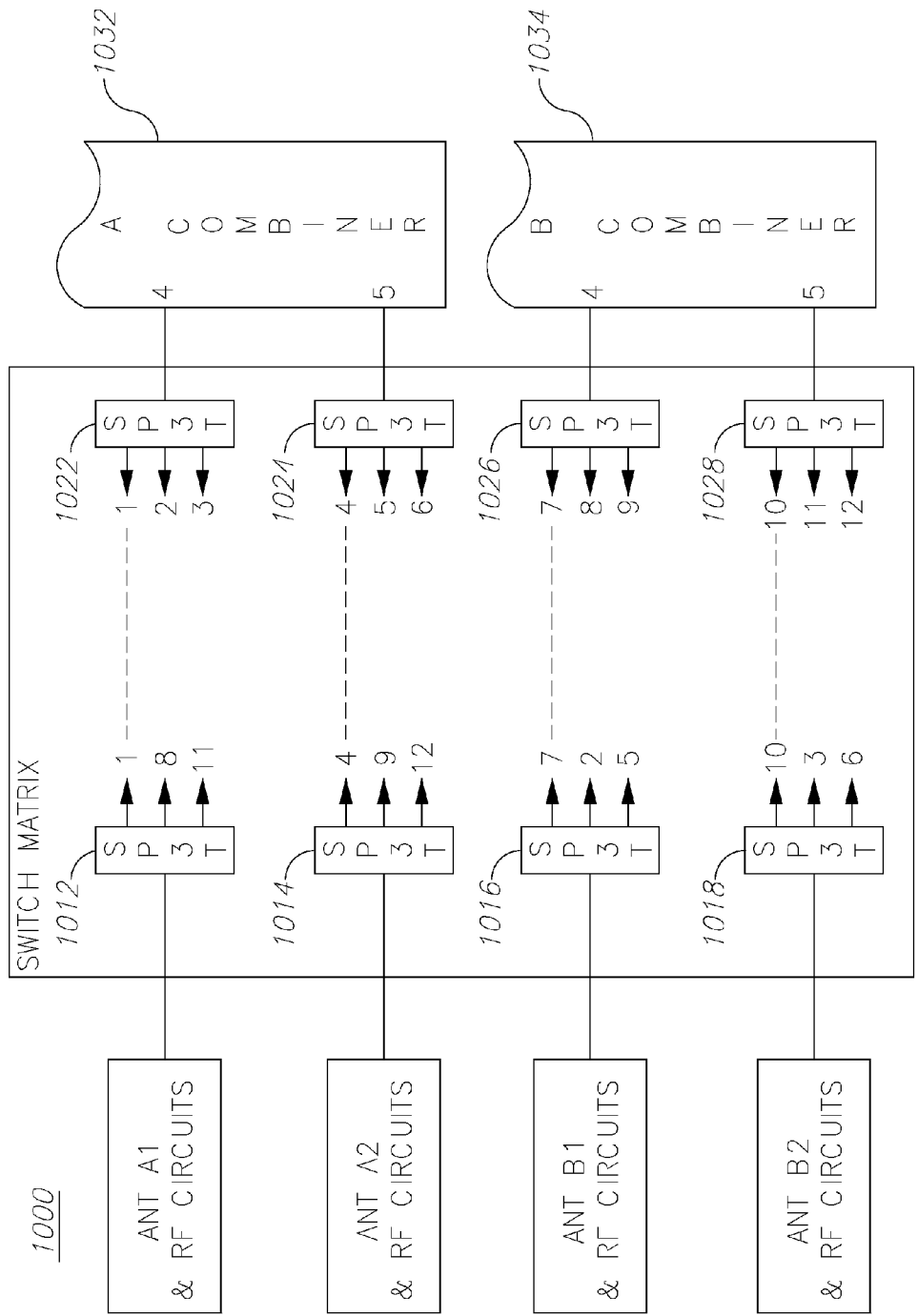
FIG. 10 is a schematic high level illustration of the switch matrix, as implemented for the system of FIG. 11, according to some embodiments of the invention.

As shown in FIG. 8, the circuit of FIG. 9 must be duplicated to route the "bypass" signals from the antennas. Additional switch matrices may be added to pool other antennas. A following paragraph described later on in FIG. 10 shows how a second switch matrix could be used with antennas A1, A2, B1 and B2. The application in the system is shown in FIG. 11.

Figure 11:
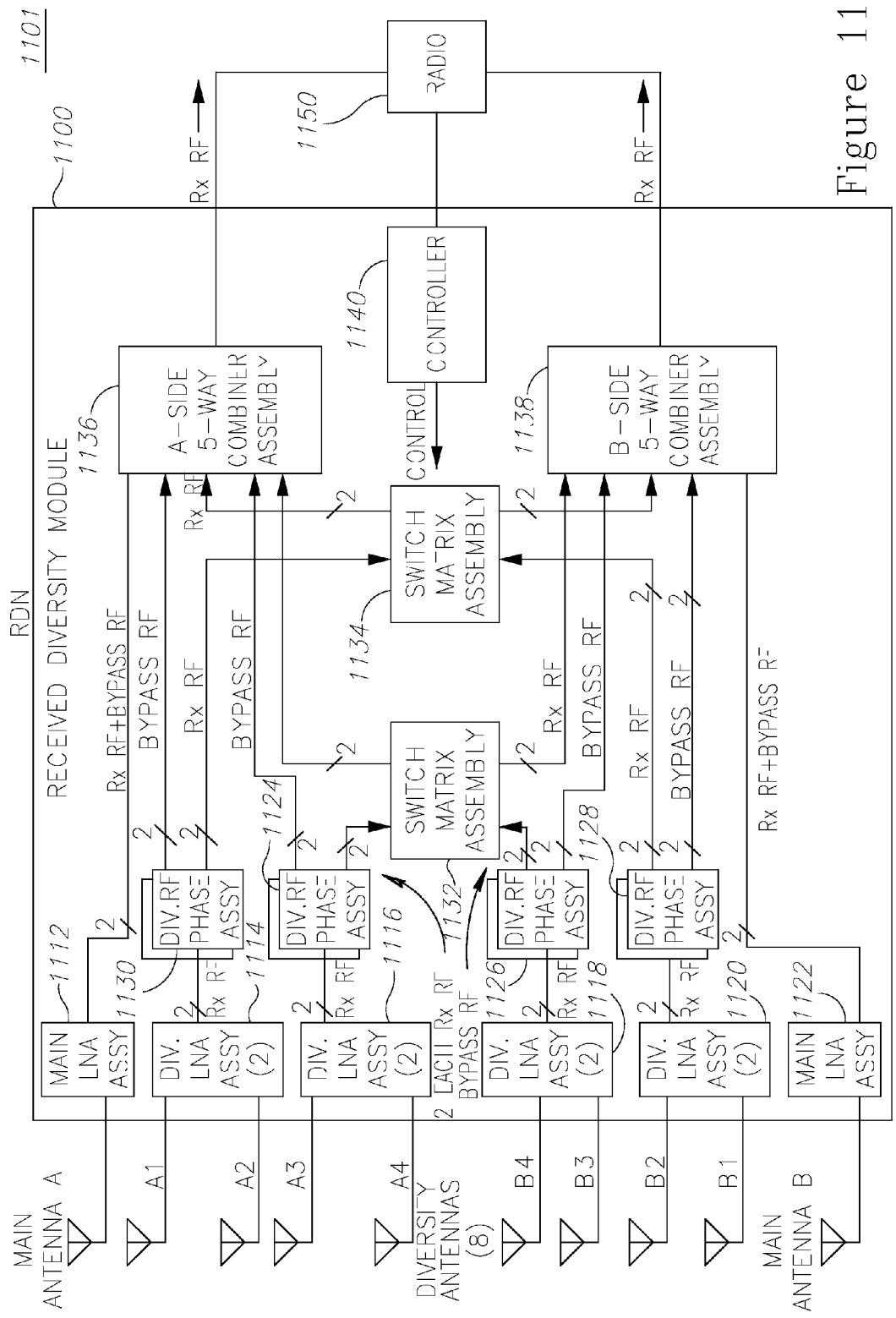
FIG. 11 is a schematic high level illustration of another MIMO receiving system having a ten antenna array with the RDN and antenna routing module pooling 2 sets of 4 antennas, according to some embodiments of the invention.

FIG. 11 is a schematic high illustration of another MIMO receiving system 1101 having a ten antenna array with the RDN and antenna routing module embodied as device 1100, according to some embodiments of the invention. One beamformer in the RDN is associated with a main antenna A and four diversity antennas A1 . . . A4 and comprises LNA assemblies 1112, 1114, 1116, phase modulators 1130, 1124 and combiner 1136, another beamformer is associated with a main antenna B and four diversity antennas B1. B4 and comprises LNA assemblies 1118, 1120, 1122, phase modulators 1126, 1128 and combiner 1138. The diversity antennas A1 . . . A4 and B1 . . . B4 are modulated by the corresponding LNA assemblies and phase modulators. The antenna routing module is implemented by switch matrix assemblies 1132 and 1134. Combiners 1136 and 1138 are connected to radio unit 1150, which is also connected to controller 1140 that manages the setting of matrices 1132, 1134 according to qualitative indicators that are derived from the baseband module.

FIG. 10 is a schematic illustration of the second switch matrix, as implemented for the system of FIG. 11, according to some embodiments of the invention. One beamformer in the RDN is associated with antennas A, A1 . . . A4 and comprises combiner 1032, another beamformer is associated with antennas B, B1 . . . B4 and comprises combiner 1034. The antenna routing module is implemented in switches 1012, 1022, 1014, 1024 and switches 1016, 1026, 1018, 1028 to be used with antennas A1, A2, B1 and B2, offering a total of 36 unique antenna configurations rather than the 6 configurations provided by only one matrix, described in FIG. 8 above.

The following is a procedure that applies optimal pooling based on desired signal's power maximization with definitions set forth below.

NBF: number of beamformers sharing the same pool.

N: number of Rx antennas in each beamformer (it could vary).

NPool: number of Rx antennas in the pool (NPool≤NBF*(N−1)).

NTx: number of Tx antennas.

NFreq: number of frequencies.

$h_{i,j,k}$: channel transfer function from Tx antenna i, i=1, 2 . . . NTx, to Rx antenna i, i=1, 2 . . . NPool, at frequency k.

$\Phi_i$: phase shift applied to Rx antenna i.

The Rx antennas are numbered from 1 to NPool. The indexes of all antennas assigned to a beamformer form a set. These sets are denoted by $SET_r$, r=1, 2 . . . NBF. For example, for two beamformers of five antennas each, the sets could be $SET_1=\{1,3,4,7,10\}$ and $SET_2=\{2,5,6,8,9\}$.

For each beamformer, phases $\Phi_i$ are optimized for example using the algorithm described in a previous disclosure.

After optimizing the delta phase of all Rx antennas in use, the combined channel transfer functions seen by the receivers are:

$$s_{r,j,k} = \sum_{i \in SET_r} h_{i,j,k} e^{j\Phi_i}, r = 1, 2 \ldots NBF,$$

$$j = 1, 2 \ldots NTx, k = 1, 2 \ldots NFreq$$

The power $PWR_{r,j,k}$ associated with $S_{r,j,k}$ is defined as:

$$PWR_{r,j,k} = [abs(S_{r,j,k})]^2, r=1,2 \ldots NBF, j=1,2 \ldots NTx, k=1,2 \ldots NFreq$$

For each beamformer, a beamformer power $BF_{PWR_r}$ is defined as:

$$BF_{PWR_r} = \sum_{j=1}^{NTx} \sum_{k=1}^{NFreq} PWR_{r,j,k}, r = 1, 2 \ldots NBF$$

The combined power of all beamformers, $PWR_{TOTAL}$, is defined as:

$$PWR_{TOTAL} = \sum_{r=1}^{NBF} BF_{PWR_r}$$

In the aforementioned embodiment, the optimal pooling is the one that maximizes $PWR_{TOTAL}$.

Following in table (1) below is a non limiting example illustrating the benefit of pooling based on the aforementioned power maximization procedure.

TABLE (1)

| Pooling TX Corr = 0.3 Rayleigh | Pooling Tx Corr = 0.3 Const. AMP | Pooling Tx Corr = 0 Rayleigh | Pooling TX Corr = 0 Const. AMP | No pooling Tx Corr = 0.3 Rayleigh | No pooling Tx Corr = 0.3 Const. AMP | No pooling Tx Corr = 0 Rayleigh | No pooling Tx Corr = 0 Const. AMP | Rx Ant. | Tx Ant. |
|---|---|---|---|---|---|---|---|---|---|
| 2.21 dB | 2.39 dB | 2.09 dB | 2.26 dB | 2.01 dB | 2.19 dB | 1.85 dB | 1.97 Db | 2 | 2 |
| 3.69 dB | 3.96 dB | 3.50 dB | 3.79 dB | 3.31 dB | 3.57 dB | 3.02 dB | 3.20 dB | 3 | 2 |
| 4.80 dB | 5.10 dB | 4.56 dB | 4.93 dB | 4.30 dB | 4.59 dB | 3.92 dB | 4.12 dB | 4 | 2 |
| 5.67 dB | 6.00 dB | 5.41 dB | 5.82 dB | 5.11 dB | 5.41 dB | 4.65 dB | 4.85 dB | 5 | 2 |
| 1.98 dB | 2.05 dB | 1.64 dB | 1.72 dB | 1.79 dB | 1.87 dB | 1.42 dB | 1.48 dB | 2 | 4 |
| 3.34 dB | 3.42 dB | 2.79 dB | 2.90 dB | 2.98 dB | 3.09 dB | 2.35 dB | 2.44 dB | 3 | 4 |
| 4.38 dB | 4.44 dB | 3.65 dB | 3.78 dB | 3.92 dB | 4.02 dB | 3.07 dB | 3.16 dB | 4 | 4 |
| 5.19 dB | 5.25 dB | 4.34 dB | 4.48 dB | 4.68 dB | 4.78 dB | 3.64 dB | 3.74 dB | 5 | 4 |

In table (1) above, various number of transmitted layers (Tx ANT), as well as various number of receiving antennas per RF beamformers (Rx Ant) are compared with and without pooling.

In addition, table (1) presents how the received power changes when several variants are introduced, such as fading models (constant amplitude and Rayleigh), as well as different Tx ANT correlations (0, 0.3 are shown).

Throughout table (1) the performance metric used is gain achieved by a MIMO augmented by an RDN, over legacy MIMO (i.e., not augmented architecture) with the same number of layers, is expressed in dB. As the table shows, an increase in dB is achieved for all pooling cases, both for correlated and uncorrelated antennas and for various number of receive and transmit antennas alike.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A system comprising:
    a multiple-input-multiple-output (MIMO) receiving system comprising a MIMO baseband module having N branches;
    a radio distribution network (RDN) connected to the MIMO receiving system, the RDN comprising at least two beamformers, wherein each of the beamformers is fed by two or more antennas, so that a total number of antennas in the system is M, wherein M and N are integers and M is greater than N, wherein each of the beamformers includes at least one combiner configured to combine signals coming from the antennas feeding the respective beamformer into a combined signal; and
    an antenna routing module configured to swap at least one pair of antennas, each of the antennas in the at least one pair being associated with a different beamformer,
    wherein said antenna routing module is configured to swap said at least one pair of antennas based on at least one qualitative indicator derived from the baseband module, wherein the at least one qualitative indicator comprises a combined power of all beamformers, $PWR_{TOTAL}$, defined as:

$$PWR_{TOTAL} = \sum_{r=1}^{NBF} BF_{PWR_r},$$

wherein NBF represents the number of beamformers and $BF_{PWR_r}$ represents the total received power by beamformer r, and the at least one swapped pair of antennas is selected to maximize $PWR_{TOTAL}$.

2. The system of claim 1, wherein the antenna routing module is configured to route a subset of the antennas with respect to corresponding beamformers by a switching matrix that is dynamically adjusted according to the at least one qualitative indicator.

3. The system of claim 1, wherein the at least one swapped pair of antennas is selected to increase a diversity gain of the MIMO receiving system.

4. The system of claim 1, wherein the at least one swapped pair of antennas is selected with respect to at least one of signal phases and signal amplitudes.

5. The system of claim 1, wherein the at least one swapped pair of antennas is selected according to a specified antenna signal weighting.

6. A method of improving reception by a multiple-input-multiple-output (MIMO) receiving system comprising a MIMO baseband module having N branches and a radio distribution network (RDN) connected to the MIMO receiving system, the method comprising:
    associating at least two beamformers with the RDN, each of the beamformers including at least one corresponding combiner;
    feeding each of the beamformers by two or more antennas, so that a total number of antennas in the system is M, wherein M and N are integers and M is greater than N,
    configuring each combiner to combine signals coming from the antennas feeding the corresponding beamformer into a combined signal; and
    swapping at least one pair of antennas, each of the antennas in the at least one pair being associated with a different beamformer, based on at least one qualitative indicator derived from the baseband module, wherein the at least one qualitative indicator comprises a combined power of all beamformers, $PWR_{TOTAL}$, defined as:

$$PWR_{TOTAL} = \sum_{r=1}^{NBF} BF_{PWR_r},$$

wherein NBF represents the number of beamformers and $BF_{PWR_r}$ represents the total received power by beamformer r, and the at least one swapped pair of antennas is selected to maximize $PWR_{TOTAL}$.

7. The method of claim 6, further comprising routing a subset of the antennas with respect to corresponding beamformers by a switching matrix that is dynamically adjusted according to the at least one qualitative indicator.

8. The method of claim 6, wherein the at least one swapped pair of antennas is selected to increase a diversity gain of the MIMO receiving system.

9. The method of claim 6, further comprising selecting the at least one swapped pair of antennas with respect to at least one of signal phases and signal amplitudes.

10. The method of claim 6, further comprising selecting the at least one swapped pair of antennas according to a specified antenna signal weighting.

* * * * *